United States Patent [19]

Kazino et al.

[11] Patent Number: 4,900,206
[45] Date of Patent: Feb. 13, 1990

[54] NUT WITH COVER

[75] Inventors: Hiroshi Kazino, Komaki; Masaaki Ide, Aichi, both of Japan

[73] Assignee: K. K. Aoyama Seisakusho, Nagoya, Japan

[21] Appl. No.: 313,501

[22] Filed: Feb. 22, 1989

[30] Foreign Application Priority Data

Feb. 27, 1988 [JP] Japan .................. 63-25494[U]

[51] Int. Cl.[4] .......................................... F16B 37/14
[52] U.S. Cl. ................................... 411/377; 411/431
[58] Field of Search ........ 411/431, 430, 429, 371–373, 411/375, 377, 3–5, 302, 303

[56] References Cited

U.S. PATENT DOCUMENTS

| | | | |
|---|---|---|---|
| 2,348,308 | 5/1944 | Richardson | 411/303 |
| 3,299,933 | 1/1967 | Akashi | 411/302 |
| 3,635,272 | 1/1972 | Scheffer | 411/303 |
| 3,726,178 | 4/1973 | Dimitry | 411/371 |
| 4,214,505 | 7/1980 | Aimar | 411/373 |
| 4,600,343 | 7/1986 | Frerejacques | 411/5 X |

FOREIGN PATENT DOCUMENTS

| | | | |
|---|---|---|---|
| 0024935 | 3/1981 | European Pat. Off. | 411/431 |
| 3537867 | 5/1987 | Fed. Rep. of Germany | 411/303 |

Primary Examiner—Lloyd A. Gall
Attorney, Agent, or Firm—Fleit, Jacobson, Cohn, Price, Holman & Stern

[57] ABSTRACT

A cover of synthetic resin is formed within a stepped recess of a nut adjacent the upper end of the internally threaded portion by injection molding. The cover includes a ring-like mounting frame positioned in the stepped recess, and a covering plate positioned inside the ring-like mounting frame and connected to it by a hinge portion of the cover. The ring-like mounting frame have an integral portion provided at the lower portion of the frame and firmly engaging a portion of the inner surface of the internally threaded portion.

2 Claims, 3 Drawing Sheets

NUT WITH COVER

BACKGROUND OF THE INVENTION

1. Field of the Invention

The present invention relates to a nut with a cover, which is adapted to be secured to, for instance, a floor panel of a motor vehicle by means of welding or clinching.

2. Description of the Prior Art

When various members are to be fastened onto, for instance, a floor panel of a motor vehicle by means of bolts, nuts such as weld nuts and pierce nuts are secured to the panel by welding or clinching. A thick coating such as a coating of vinyl chloride sol, is applied on the panel for prevention of rust, after securing the nuts to the panel, and in this case, there is a risk that the coating may also be applied to the internal threads of the nuts. In order to avoid this risk, it has hitherto been known to mask the nuts before the coating of vinyl chloride is effected. However, if a large number of nuts are used for the panel, the masking process becomes very troublesome. To cope with this problem, the present inventors have previously proposed a nut with cover, in Japanese Utility Model Laid-Open No. 115010/1986, in which a cover of synthetic resin is injection-molded in the internally threaded portion of a nut so as to prevent any penetration of coating into the internally threaded portion. However, it has been found that this covered nut would encounter a difficulty in actual use. That is, when bolts are screwed into the nuts, the material forming the covers is pushed out from the nut by the leading end of the bolts and the covers are scattered in every direction around the motor vehicle assembly line.

SUMMARY OF THE INVENTION

It is an object of the present invention to overcome the above-mentioned disadvantages and to provide a nut with a cover, which enables a coating such as vinyl chloride sol to be applied without any need for masking process after securing the nut to a panel, and which allows a bolt-fastening operation to be performed without encountering any difficulty or the risk of scattering debris.

To this end, one aspect of the present invention provides a nut with a cover, comprising: a main nut body having internally threaded portion, and a stepped recess formed in the body adjacent the upper end of the internally threaded portion, the wall of the stepped recess being shaped to define an inward ledge; and a cover of synthetic resin formed within the stepped recess by injection molding, the cover including a ring-like mounting frame, and a covering plate connected to the mounting frame by means of an integral hinge portion.

Another aspect of the present invention provides a nut with a cover, comprising: a main nut body having an internally threaded portion, stepped recess formed in the body adjacent the upper surface of the internally threaded portion; and a cover of synthetic resin formed within the stepped recess by injection molding, the cover including a ring-like mounting frame having at the lower end thereof a ring-like reinforcement engaging the inner surface of the internally threaded portion, and a covering plate connected to the mounting frame by means of an integral hinge portion.

DESCRIPTION OF THE PREFERRED EMBODIMENTS

The present invention will be described hereunder in detail with respect to certain embodiments thereof which concern weld nuts by way of example.

Figure 1:
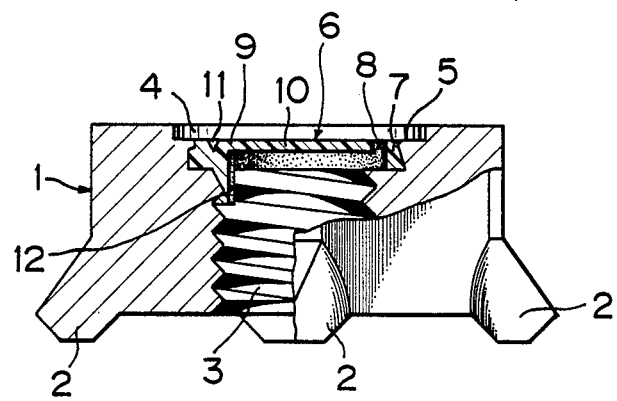
FIG. 1 is a sectional view of a nut with a cover, in accordance with a first embodiment of the present invention.
Figure 2:
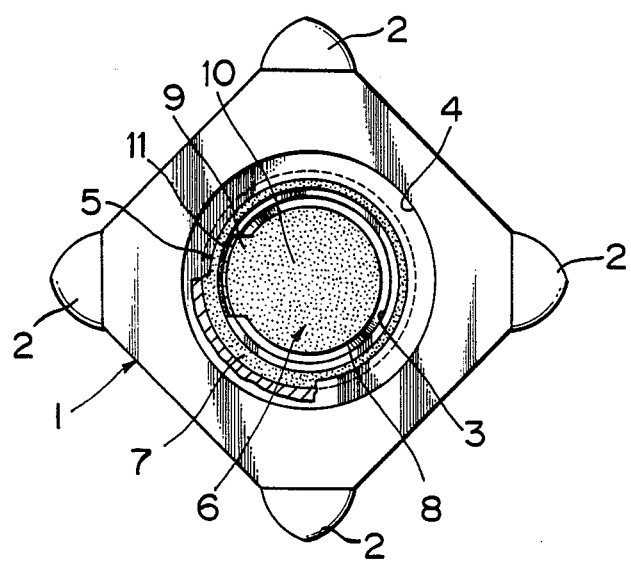
FIG. 2 is a partially cutaway plan view of the nut with the cover, shown in FIG. 1.

Referring to FIGS. 1 and 2 illustrating a first embodiment of the present invention, a nut with a cover comprises a main nut body 1 having welding projections 2 provided on the surface of the body 1 at which the body 1 is located on a base plate such as a floor panel of a motor vehicle, and an internally threaded portion 3 in the body. A stepped recess 4 having a diameter larger than that of the internal threads is formed in the body in the vicinity of the end of the internally threaded portion 3 which is remote from the surface on which the body 1 is secured to the base plate. The wall of the stepped recess 4 is shaped to define an inward ledge 5. The ledge 5 may be formed by deforming downwardly the upper peripheral wall of the stepped recess 4. The nut further comprises a cover 6 of a synthetic resin formed within the stepped recess 4 at the upper end of the internally threaded portion 3 by injection molding. The cover 6 has a covering plate 10 positioned inside a ring-like mounting frame 7 and connected to the frame 7 by means of an integral hinge portion 9. An annular gap 8 is defined between the mounting frame 7 and the covering plate 10 except the location of the hinge portion 9. The cover 6 is securely mounted in the nut body 1 by engagement of the mounting frame 7 with the lower surface of the ledge 5 of the main nut body 1. The hinge portion 9 of the cover 6 has a V-shaped groove 11 formed in the upper surface of the hinge portion adjacent its proximal end to facilitate the upward bending of the hinge portion 9. A reinforcement 12 extends from the mounting frame 7 below the hinge portion 9 and is formed on a portion of the internal threads 3 during injection-molding to increase the bonding of the cover 6 to the main nut body 1.

Figure 3:
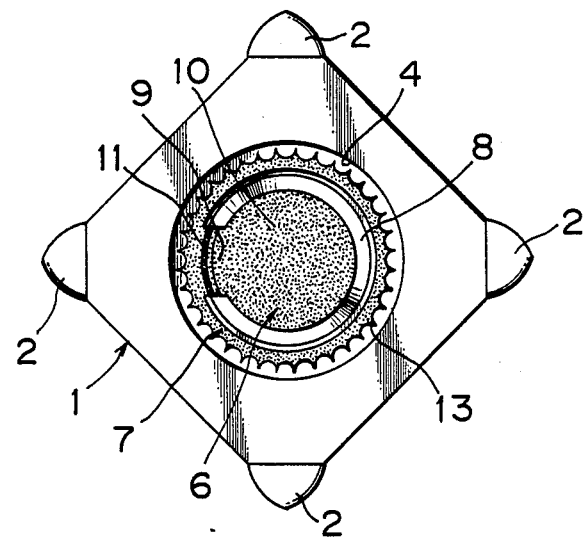
FIG. 3 is a plan view showing a modification of the invention.

Referring to FIG. 3 showing a modification of the invention, a large number of notches 13 are formed in the inner wall of the stepped recess 4 of the main nut body 1. The ring-like mounting frame 7 of the cover 6 engages these notches 13 to effectively prevent it from rotating relative to the nut body.

Figure 4:
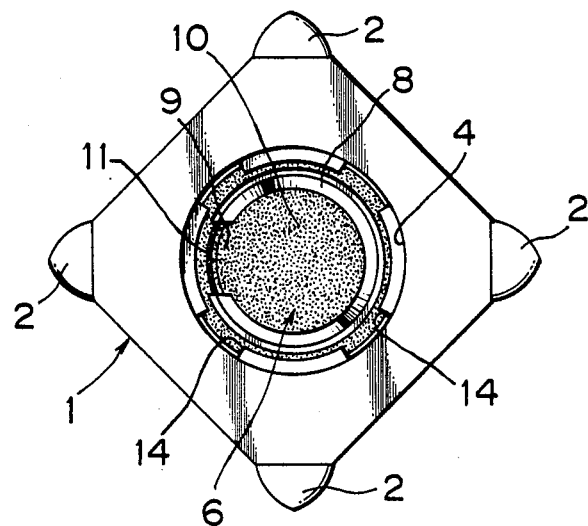
FIG. 4 is a plan view showing another modification of the invention.

Referring to FIG. 4 showing another modification of the invention, a plurality of relatively radially deep notches 14 are formed in the inner surface of the ledge 5 of the stepped recess 4 of the main nut body 1 to ensure that engagement of the ring-like mounting frame 7 with the notches 14 prevents any rotation of the cover relative to the nut body.

Figure 5:
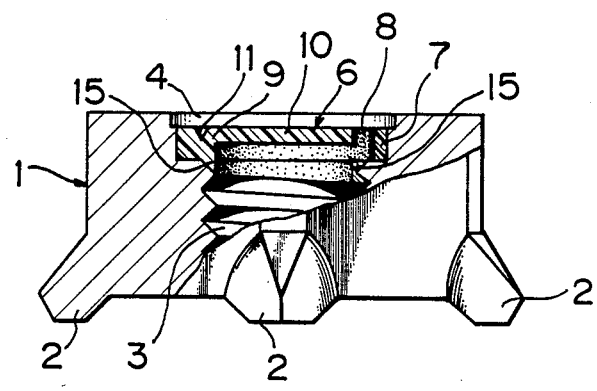
FIG. 5 is a sectional view of a nut with a cover, in accordance with a second embodiment of the present invention.
Figure 6:
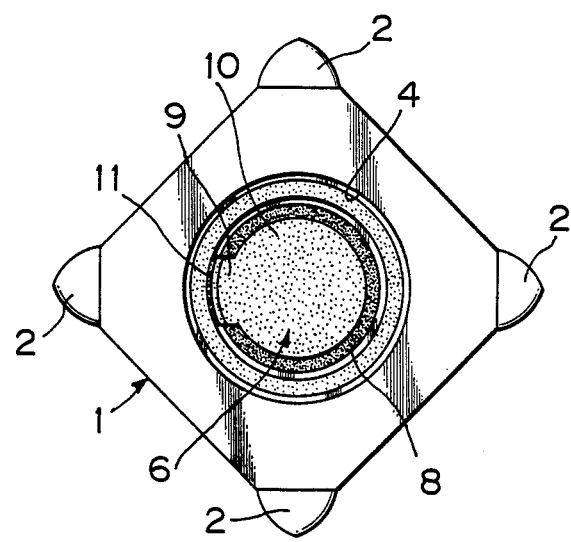
FIG. 6 is a plan view of the nut with the cover, shown in FIG. 5.

FIGS. 5 and 6 illustrate a second embodiment of the present invention, which employs, instead of the reinforcement 12 shown in FIG. 2, a ring-like reinforcement 15 engaging the entire inner peripheral surface of the internally threaded portion 3 adjacent its upper end. In this embodiment, the inward ledge 5 in the first embodiment may be removed. An advantage derived from the second embodiment will be described later.

In use, after the nut body 1 of each of the nuts has been secured on its lower surface to the base plate such as a floor panel of a motor vehicle by means of welding or clinching, the base plate is subjected to chemical treatment forming, cation electrodeposition coating, and vinyl chloride sol coating. A bolt will, then, be threadedly received into the nut to fasten members to the base plate. Due to the fact that the nut with the cover in accordance with the present invention has the injection-molded synthetic-resin cover 6 provided at the upper end of the internal threads 3, the cover 6 serves to prevent the coating of vinyl chloride sol from penetrating into the nut body 1 during the application of the coating, thereby avoiding any adhering of coating onto the internal threads 3 which would result in poor fastening. Further, when the bolt is screwed into the main nut body 1 from below its lower surface, the bolt swings up the covering plate 10 around the axis of the hinge portion 9, thereby enabling the bolt to be smoothly threadedly engaged with the internal threads 3. Furthermore, since the ring-like mounting frame 7 is firmly retained in the stepped recess 4 formed in the nut body at the upper end of the internally threaded portion, by the inward ledge 5, 3, the cover 6 is prevented from being pushed out of the main nut body 1. Still further, the gap 8 defined between the mounting frame 7 and the covering plate 10 is large enough to allow the passage of a high-fluidity coating such as a cation electrodeposition coating to be applied onto the base plate by dipping prior to coating with a vinyl chloride sol coating. Thus, even if a coating of this type enters the nut, the coating will be easily discharged from the interior of the nut through the gap 8 without adhering to the internally threaded portion 3. A small hole may be formed in the covering plate 10 at its center to ensure that a coating of this type is positively discharged.

In the case of the nut with the cover in accordance with the second embodiment, when the bolt is screwed into the main nut body 1 from below its lower surface, the leading end of the bolt acts to strongly press the ring-like reinforcement 15 against the internal threads 3 of the main nut body 1, thereby preventing the cover from slipping off from the internal threads of the main nut body 1. As the bolt continues to be screwed into the but, it swings up the cover 6 around the axis of the hinge portion 9 in the same manner as that described before so that engagement of the bolt with the internal threads 3 will not be obstructed by the cover 6. Means for preventing the cover from being pushed out from the nut by a bolt as shown in FIG. 3 or 4 may be adopted in the second embodiment to achieve a further excellent slip-preventing effect.

As will be clearly understood from the description given above, according to the present invention, a cover formed of synthetic resin prevents any penetration of a coating such as vinyl chloride sol into the nut and this makes it unnecessary to perform masking of the threaded bore of the nut after it has been secured to the panel. Further, the cover is capable of being swung up easily by the leading end of a bolt, to allow the bolt to be completely tightened by fastening it in the same manner as in the case where an ordinary nut is used. Still further, since the cover in accordance with the present invention does not become separated from the main nut body in use, there is no risk of any part of the cover being scattered around the assembly line. Thus, the present invention solves the problems encountered by conventional nuts of this type, and, in this respect, it possesses significant practical value.

What is claimed is:

1. A nut with a cover, comprising: a main nut body having an internally threaded portion, and a stepped recess formed in the body adjacent the upper end of the internally threaded portion, the wall of the stepped recess being shaped to define an inward ledge; and a cover of synthetic resin formed within the stepped recess by injection molding, the cover including a ring-like mounting frame, and a covering plate connected to the mounting frame by means of an integral hinge portion.

2. A nut with a cover, comprising: a main nut body having an internally threaded portion, a stepped recess formed in the body adjacent the upper surface of the internally threaded portion; and a cover of synthetic resin formed within the stepped recess by injection molding, the cover including a ring-like mounting frame having at the lower end thereof a ring-like reinforcement engaging the internally threaded portion, and a covering plate connected to the mounting frame by means of an integral hinge portion.

* * * * *